United States Patent [19]
Okabayashi

[11] Patent Number: 5,519,880
[45] Date of Patent: May 21, 1996

[54] PARALLEL PROCESSING SYSTEM AND DATA TRANSFER METHOD WHICH REDUCES BUS CONTENTION BY USE OF DATA RELAYS HAVING PLURALITY OF BUFFERS

[75] Inventor: Ichiro Okabayashi, Osaka, Japan

[73] Assignee: Matsushita Electric Industrial Co., Ltd., Osaka, Japan

[21] Appl. No.: 312,543

[22] Filed: Sep. 26, 1994

Related U.S. Application Data

[62] Division of Ser. No. 853,249, Mar. 18, 1992, Pat. No. 5,388,220.

[30] Foreign Application Priority Data

Mar. 19, 1991 [JP] Japan ................................. 3-054529

[51] Int. Cl.$^6$ ................................. G06F 13/00
[52] U.S. Cl. .................. 395/800; 395/834; 364/DIG. 1; 364/243
[58] Field of Search ................................. 395/800, 200, 395/275, 325, 725, 250, 500, 425, 821, 834, 840, 872

[56] References Cited

U.S. PATENT DOCUMENTS

| | | | |
|---|---|---|---|
| 4,763,247 | 8/1988 | Borovski et al. | 370/60 |
| 4,768,190 | 8/1988 | Giancarlo | 370/86 |
| 5,121,480 | 6/1992 | Bonke et al. | 395/250 |
| 5,133,062 | 7/1992 | Joshi et al. | 395/500 |
| 5,210,749 | 5/1993 | Firoozmand | 370/85.1 |
| 5,295,012 | 3/1994 | Wilson et al. | 370/85.7 |
| 5,353,432 | 10/1994 | Richek et al. | 395/500 |
| 5,388,220 | 2/1995 | Okabayashi | 395/275 |
| 5,418,752 | 5/1995 | Harari et al. | 365/218 |

Primary Examiner—Mehmet Geckil
Attorney, Agent, or Firm—Willian Brinks Hofer Gilson & Lione

[57] ABSTRACT

A parallel processing system consists of a plurality of processor elements and a network for connecting the processor elements to each other. The processor includes a processor, a memory and a data transfer apparatus, all connected to a common bus. The data transfer apparatus includes of three buffers, while a data relay includes two buffers. In data transfer from a processor element to another processor element, a data is relayed in a third processor element only with use of a buffer, or a write/read operation is not performed in the third processor element. Then, the overhead is decreased and the transfer capability is improved. Further, the data transfer apparatus does not access the common bus, so that the width of the bus can be increased, and the processing performance of the processor can be improved.

5 Claims, 20 Drawing Sheets

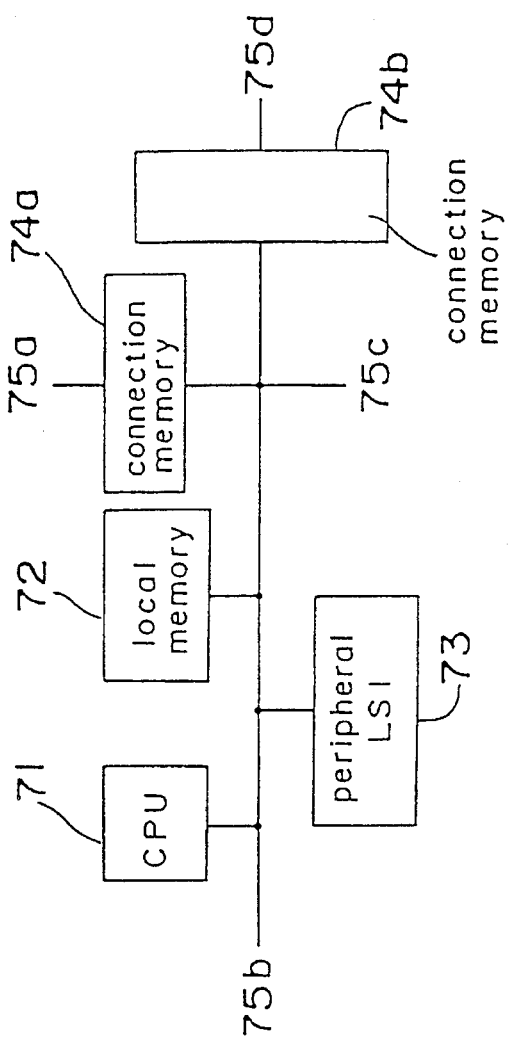
Fig. 5 (b) PRIOR ART
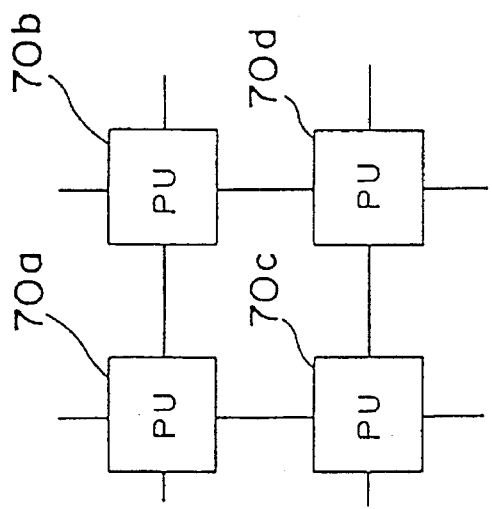
Fig. 5 (a) PRIOR ART 5,519,880

PARALLEL PROCESSING SYSTEM AND DATA TRANSFER METHOD WHICH REDUCES BUS CONTENTION BY USE OF DATA RELAYS HAVING PLURALITY OF BUFFERS

This is a divisional of application Ser. No. 07/853,249, filed Mar. 18, 1992 now U.S. Pat. No. 5,388,220

BACKGROUND OF THE INVENTION

1. Field of the Invention

The present invention relates to a parallel processing system, or in detail to the communication between processor elements in a parallel processing system.

2. Description of the Prior Art

A parallel processing system generally consists of processor elements (PE) for processing calculation and a network for transferring data between processor elements.

FIG. 1 shows a part of a first prior art parallel processing system, FIG. 2 shows a prior art data transfer apparatus, and FIG. 3 shows a prior art data relay. These devices are disclosed in detail in ICD 89-152 of an integrated circuit symposium of the Institute of Electronics, Information and Communication Engineers.

The first prior art parallel data processing system shown in FIG. 1 consists of processor elements $1a'$, $1c'$ and $1d'$ and a network $2'$ connecting the processor elements to each other. The processor elements $1a'$, $1c'$ and $1d'$ have the same structure. For example, the processor element $1a'$ consists of a processor $3a'$, a memory $4a'$ and a data transfer apparatus $5a'$, all connected to a common bus. The data transfer apparatus $5a'$ has two buffers $7a'$, $9a'$. Further, data relay apparatuses $6a'$ and $6e'$ are provided in the network $2'$. In the network $2'$, a communication between any two processor elements can be possible via only a third processor element. (That is, the PE distance equals two.) In the above-mentioned parallel processing system, data flows from the processor element $1a'$ to $1d'$ via the memory $4a'$, the buffer $7a'$, the buffer $10a'$, the buffer $9c'$, the memory $4c'$, the buffer $7c'$, the buffer $10e'$, the buffer $9d'$ and the memory $4d'$, as shown with a dashed line in FIG. 1.

In the data transfer apparatus $5'$ shown in FIG. 2, an input/output port $17a'$ is connected to the memory $4'$, while input/output ports $17b'$, $17c'$ are connected to the network $2'$.

Data flow from the input/output port $17a'$ to $17b'$ is as follows: An address $50a'$ is sent from a memory address generator $12a'$ via a selector $18a'$ to the memory $4'$, and a data $51a'$ is taken via the input/output port $17a'$ in the buffer $7'$ (memory read). Next, an address $50b'$ is sent by a relay address generator $15a'$ to the network $2'$, and a data $51b'$ is sent via the input/output port $17b'$.

Data flow from the input/output port $17c'$ to $17a'$ is as follows: An address $50c'$ is sent by a relay address generator $15b'$ to the network $2'$, and a data $51c'$ is taken via the input/output port $17c'$ to be written in a buffer $9'$. Next, an address $50a'$ is sent by a memory address generator $12b'$ via the selector $18a'$ to the memory $4'$ and a data $51a'$ is sent from the buffer $9'$ to the memory $4'$ (memory write). Controllers $16a'$, $16b'$ monitor buffer statuses $52a'$, $52b'$.

In the data relay $6'$ shown in FIG. 3, a data $51a'$ is stored in a buffer $10'$. A controller $31a'$ controls a read/write of the buffer $10'$. Decoders $30a'$, $30b'$ monitor addresses $50a'$, $50c'$, and make tri-state buffers $32a'$, $32b'$ enable when the decoders $30a'$, $30b'$ are accessed, to pass buffer statuses $52a'$, $52b'$ to the external. The buffer statuses $52a'$, $52b'$ relate to "buffer full" as to write and "buffer empty" as to read.

FIG. 4 illustrates a prior art data transfer method. This shows an example of the network $2'$ of complete crossbar network. A number on the order of data transfer is displayed in each block of data relay apparatuses $6a'$–$6p'$. That is, in a first step, four processor elements $1a'$, $1b'$, $1c'$ and $1d'$ send a data to data relays $6a'$, $6e'$, $6i'$ and $6m'$, respectively, at the same time. In the next step, the processor element $1a'$, $1b'$, $1c'$ and $1d'$ send a data to data relays $6b'$, $6f'$, $6j'$ and $6n'$, respectively, at the same time. Data transfer is performed further similarly. When a data are transferred to the final column of data relays $6d'$, $6h'$, $6i'$ and $6p'$, the data transfer is performed again by returning to the first column of the data relays. After the first step is completed, the processor element $1a'$ can receive data via the data relay $6a'$.

However, in the above-mentioned parallel processing system, a processing element used for relay stores data in a memory once and read it again. Therefore, the overhead at the processing element is large. Further, a bus neck happens due to memory access, so that the performance of processor becomes low.

Further, in such a data transfer method, only the processor element $1a'$ can receive data after the first step because it is connected to the data relays $6a'$, $6e'$, $6i'$ and $6m'$. Therefore, the load concentrates only in this path, so that the transfer performance of the entire system becomes low.

Finally, FIG. 5 shows the structure of a second prior art parallel processing system disclosed in detail in CPSY 89-1 of a computer system symposium of the Institute of Electronics, Information and Communication Engineers, wherein processing units (PU) are connected like a mesh, as shown in FIG. 5(a). As shown in FIG. 5(b), each processor unit PU consists of a CPU 71, a local memory 72 and a peripheral LSI 63, all connected to a common bus. Further, it has four ports $75a$–$75d$, and communicates with another processor unit via a connection memory $74a$, $74b$ which is a 2-port RAM.

On the other hand, in the second parallel processing system, the data transfer is very fast when all the processing units communicate with the neighboring processing units at the same time, whereas the data transfer with a distant processing unit is slow. The distance between arbitrary processing units is N at maximum and N/2 on the average, in a system of N×N of processing units. This system is also not advantageous when a communication request of respective processing units happens randomly and when the extension to another network is needed.

SUMMARY OF THE INVENTION

An object of the present invention is to provide a parallel processing system and a data transfer method having high processor performance and high communication rate between processor elements.

A parallel processing system according to the present invention comprises: a plurality of processor elements including a processor, a memory and a data transfer apparatus, which data transfer apparatus including first, second and third buffers; and a network for connecting processor elements in order to transfer data between two processor elements directly or indirectly via one or more processor elements for relay. The data transfer apparatus in a processor element which sends a data in the data transfer stores a data from a memory or a processor in the first buffer and sends the data to the network. The processor element for relay receiving the data from the network in the third buffer and sends the data to the network. The data transfer apparatus in a processor element which receives a data in the data transfer writes the data from the network in the second buffer and writes the data in the memory or the processor.

Then, a memory read/write is not conducted in data relays. Therefore, the overhead at the data relays is reduced and the transfer performance in improved. Further, the data transfer apparatus does not access the bus, the bus width is broadened and the performance of the processor can be improved.

In a data transfer method according to the present invention, a parallel processing system is provided which comprises N processor elements having at least two input/output ports wherein N is an integer of two or more, and a network having N×N of two-dimensional lattice points (K, L), wherein K, L are integers between one and N, a buffer (K, L) having at least two inputs being arranged at each lattice point (K, L); wherein one terminal of a K-th processor element in the processor elements is connected commonly to one terminal of the buffers at lattice points (K, L) wherein L are integers between one and N and the other terminal of the buffers at the lattice points (K, L) wherein are integers between one and N are connected commonly, which common connection line being connected to the processor element or to the external. In the data transfer system, data are sent successively from the buffer at the lattice points (K, K) when the data are sent from the processor elements.

Thus, the K-th processor element sends data successively from the (K, K) lattice point in a cross bar network having N×N lattice points. Thus, the traffic will not be concentrated to a special bus when data are received, and the data transfer performance is improved.

An advantage of a parallel processing system of the present invention is that data transfer performance is improved.

An advantage of a data transfer method of the present invention is that load of network is scattered.

BRIEF DESCRIPTION OF THE DRAWINGS

These and other objects and features of the present invention will become clear from the following description taken in conjunction with the preferred embodiments thereof with reference to the accompanying drawings, and in which:

FIG. 5(a) is block diagram of a second prior art parallel processing system, and FIG. 5(b) is a block diagram of a prior are processor unit;

DETAILED DESCRIPTION OF THE PREFERRED EMBODIMENTS

Figure 1:
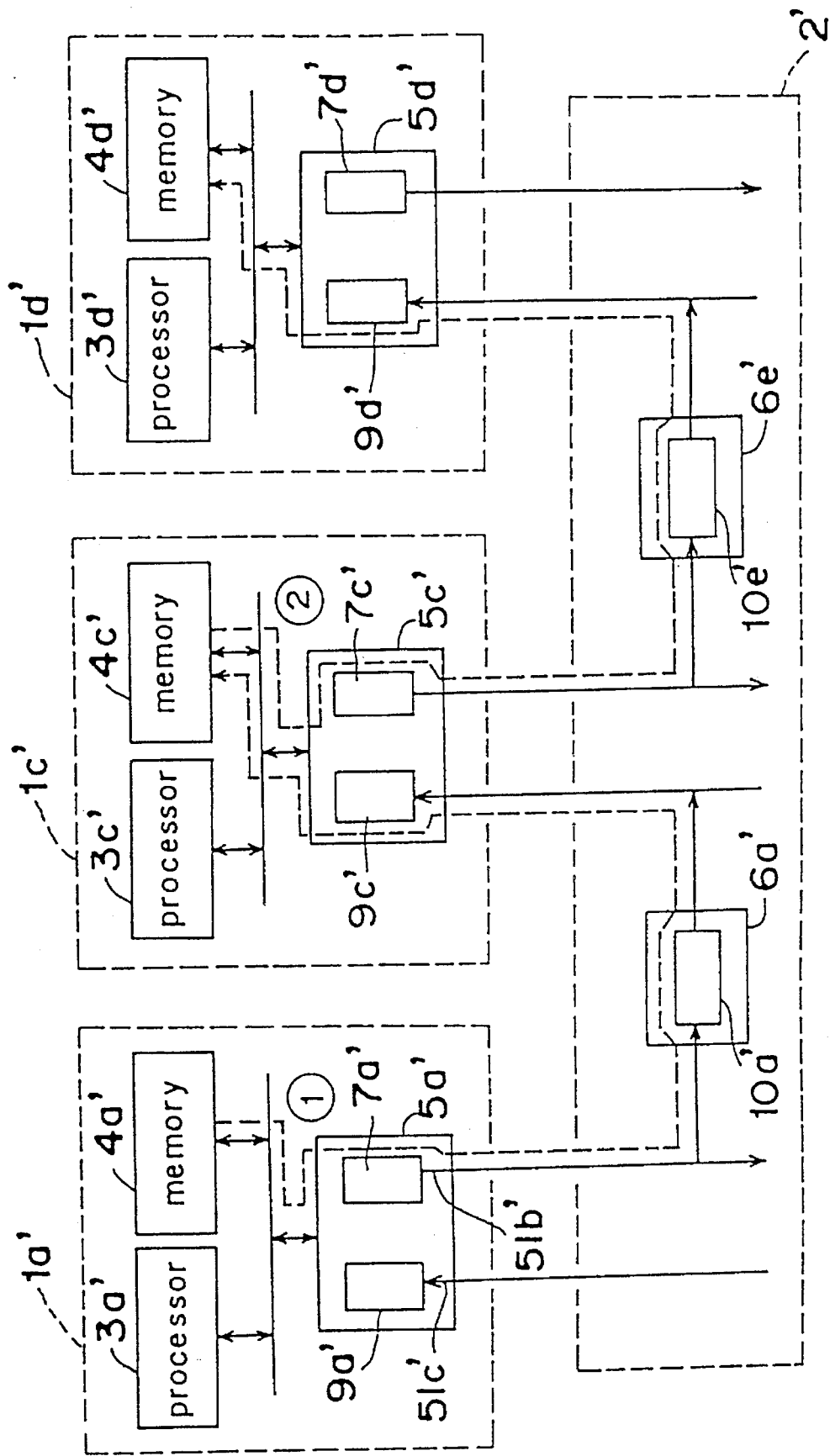
FIG. 1 is a block diagram of a prior art parallel processing system.
Figure 2:
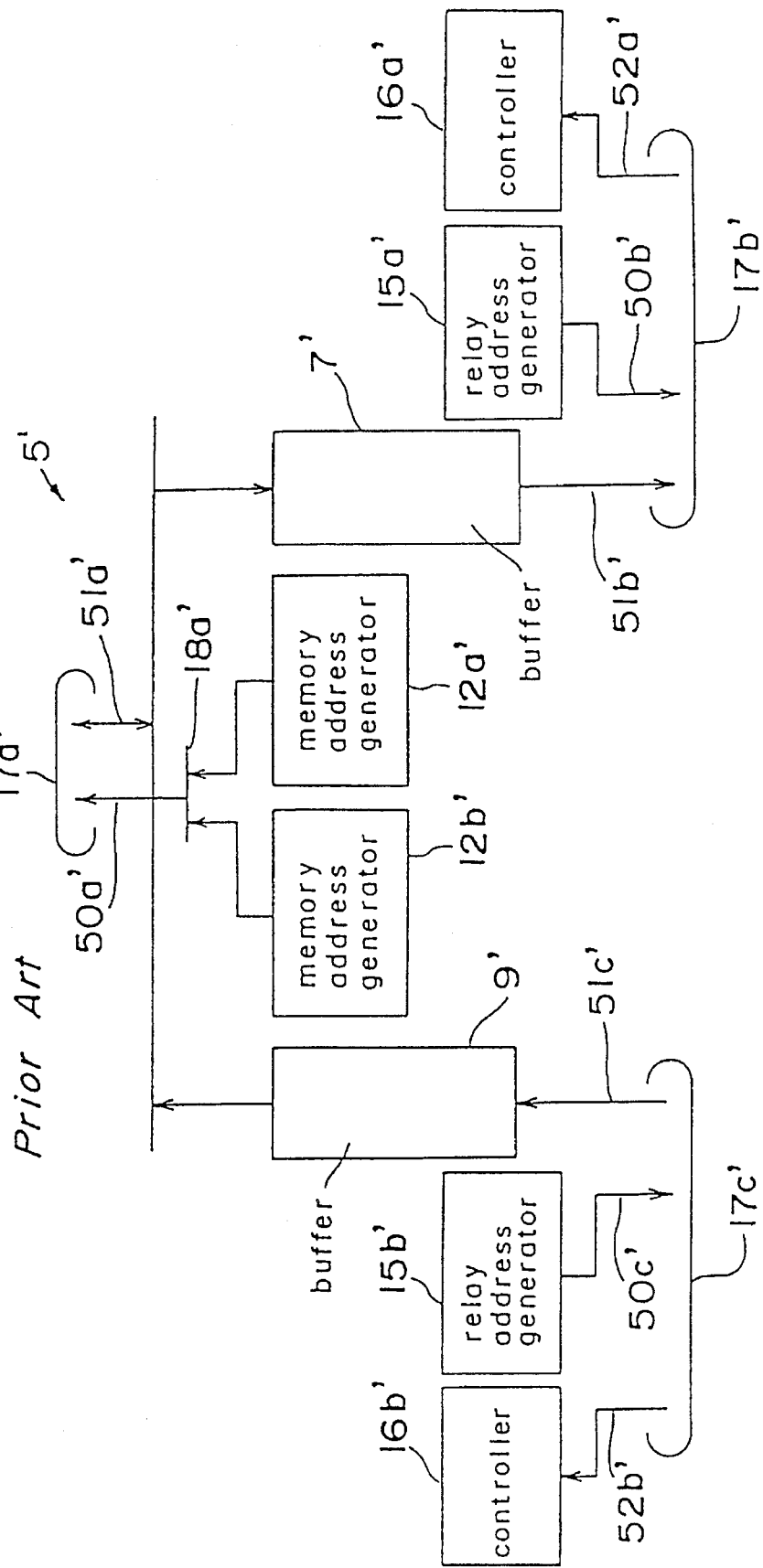
FIG. 2 is a block diagram of a prior art data transfer apparatus.

Referring now to the drawings, wherein like reference characters designate like or corresponding parts throughout the several views, embodiments of the present invention will be explained. In the embodiments, the data flow is limited in one direction for simplifying the explanation and the drawings. Further, in the network, the communication between any two processor elements is possible via a third processor element. (That is, the distance between processor elements is two.)

Figure 6:
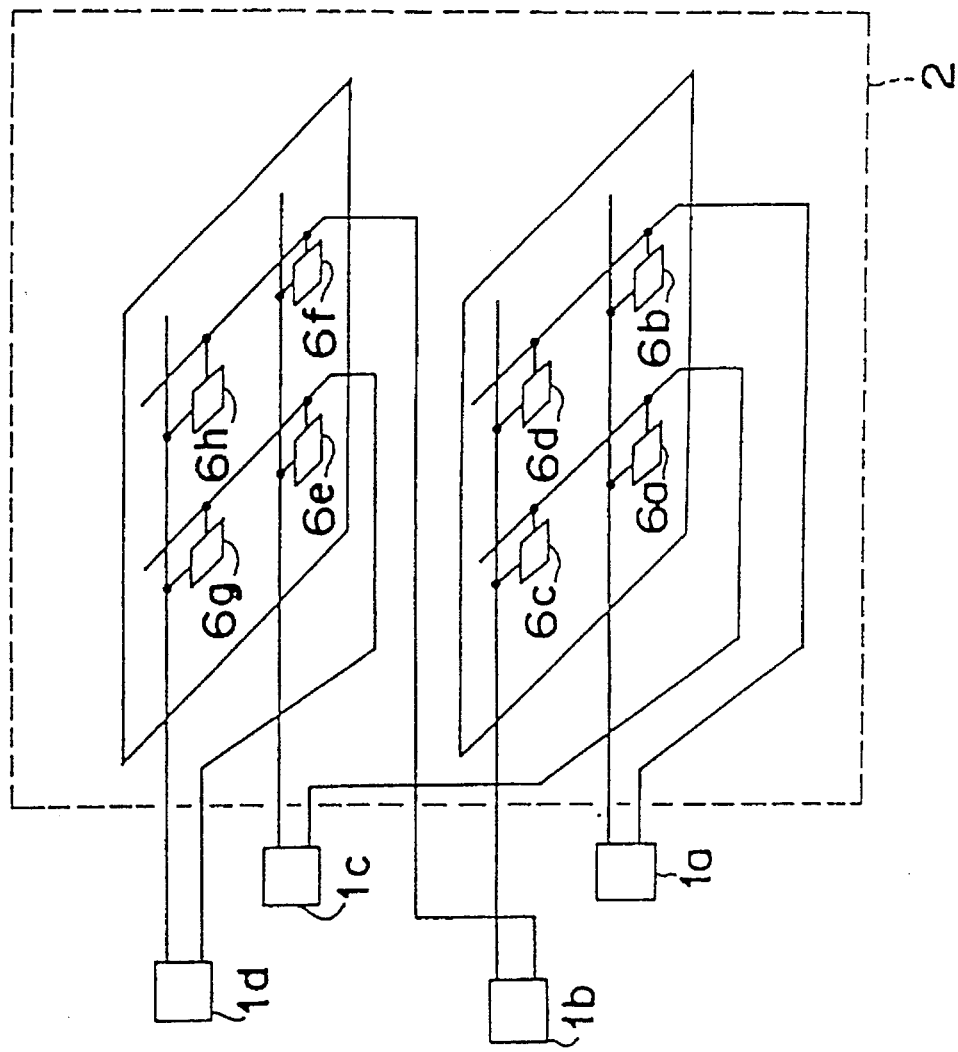
FIG. 6 is a block diagram of a parallel processing system.

FIG. 6 shows the structure of a parallel processing system in a first embodiment. The parallel processing system consists of four processor elements 1a–1d and a network 2 including eight data relays 6a –6h. The entire connection in the parallel processing system displayed in FIG. 7 will be explained later. FIG. 8 displays a part of the system shown in FIG. 6, and it shows that a data is transferred from the first processor element 1a to 1d via the first data relay 6a, the third processor element 1c and another data relay 6e.

The processing elements 1a–1d all have the same structure. As shown in FIG. 8, a processing element 1a, for example, includes a processor 3a, a memory 4a, a data transfer apparatus 5a and a common bus connecting the processor 3a, the memory 4a and the data transfer apparatus 5a. The data transfer apparatus 5a includes three buffers 7a, 8a and 9a. Data relays 6a, 6e are provided in the network 2. The data relays 6a –6h all have the same structure. For example, the data relay 6a includes two buffers 10a and 11a, while the data relays 6e includes two buffers 10e and 11e. In this system, a data flows from the first processor element 1a to the second processor element 1d in the following order: the memory 4a, the buffer 7a, the buffer 10a, the buffer 8c, the buffer 11e, the buffer 9d, and the memory 4d, as shown with a dashed line in FIG. 8.

In the third processor element 1c used for data relay, the data transfer apparatus 5c receives a data from the data relay 6a and sends the data via the internal buffer 8c to the data relay 6e. Because the memory 4c in the third processor element 1c is not accessed in the data flow, the increase in transfer rate and the broadening of bus width can be realized simultaneously.

Figure 7:
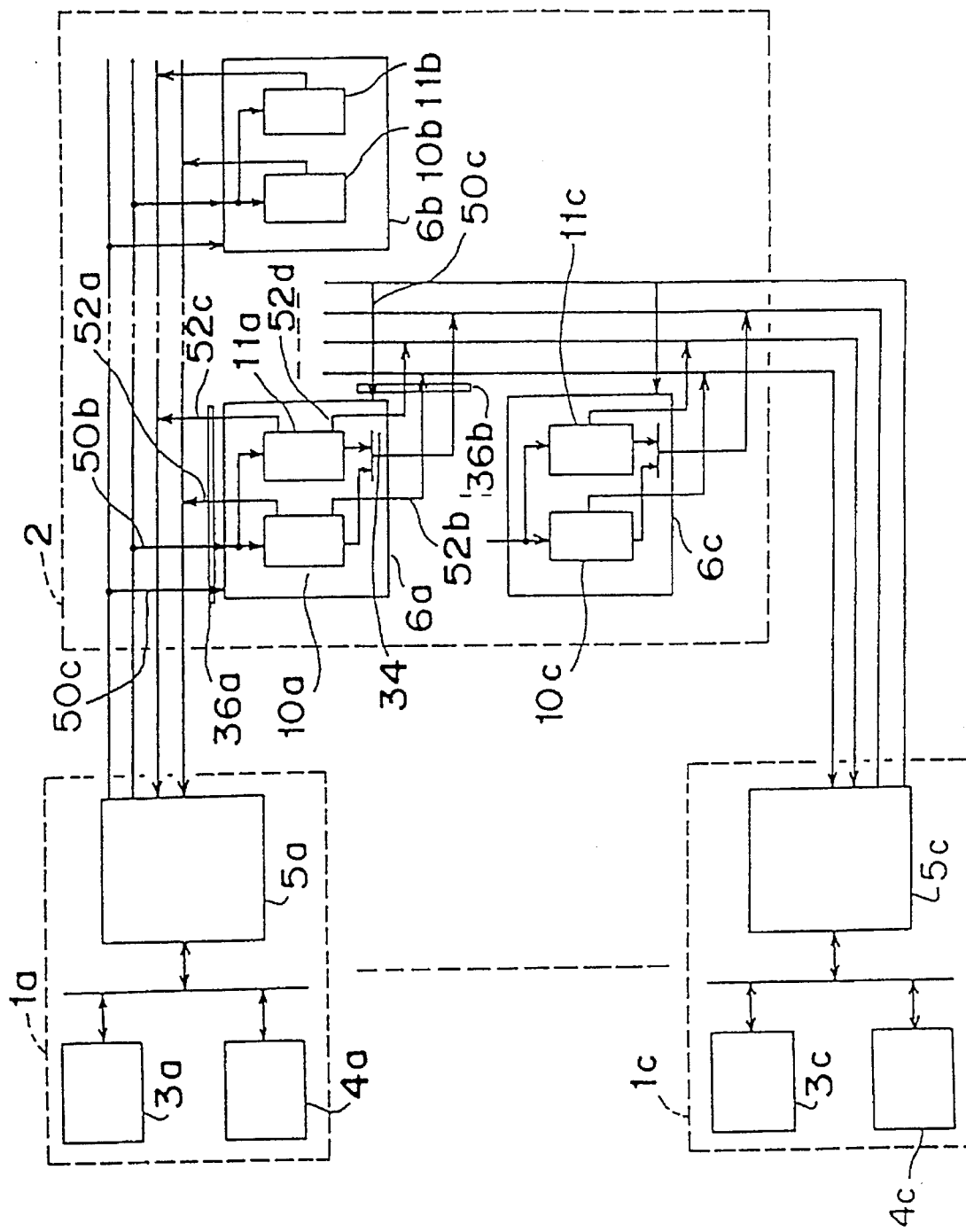
FIG. 7 is a block diagram of the parallel processing system shown in FIG. 6 for displaying the connection in detail.
Figure 8:
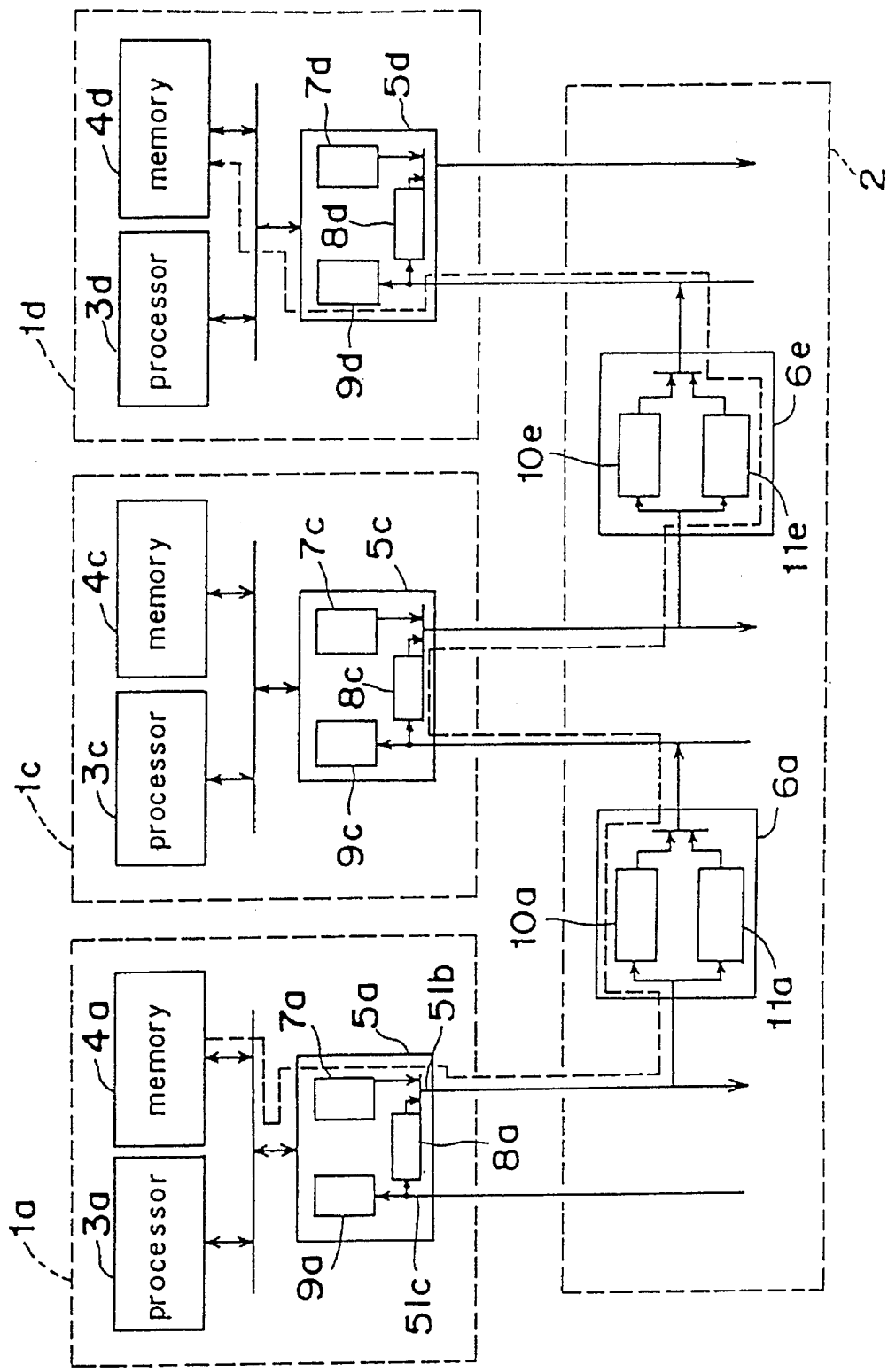
FIG. 8 is a block diagram of a part of the parallel processing system shown in FIG. 6.

FIG. 7 displays the connections of signal lines including control lines between the data transfer apparatuses 5a, 5c and the data relays 6a, 6b, 6c. Signal lines of the data relays 6a, 6b and 6c are connected commonly. An active data relay selected by a relay address transfers a data address. Only the selected data relay outputs the buffer statuses, while the other data relays are in the high impedance state.

Next, the data transfer apparatus 5, the data relay 6 or the like which are the element technology for constructing the parallel processing system will be explained below.

Figure 9:
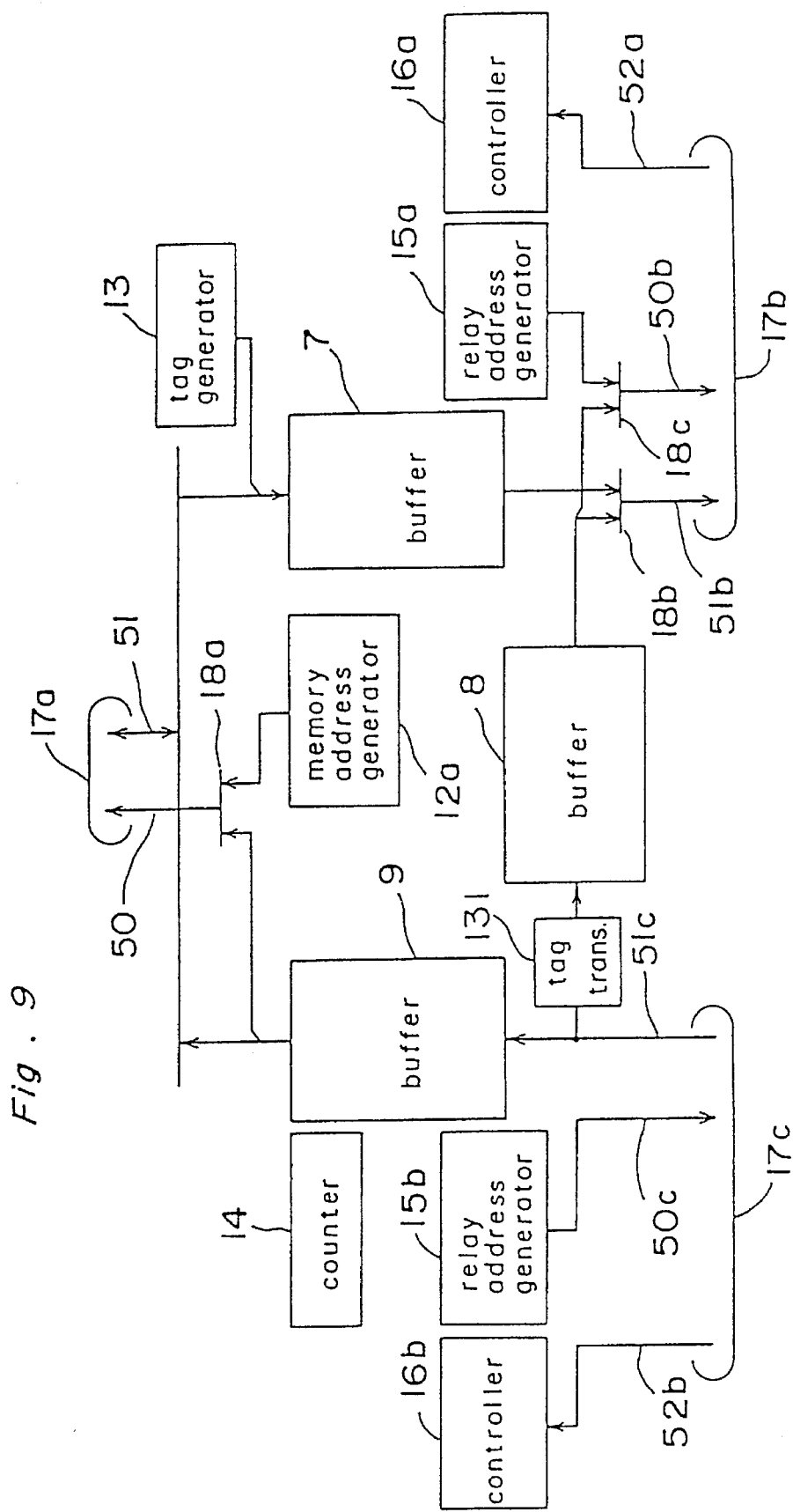
FIG. 9 is a block diagram of a data transfer apparatus.

First, the data transfer apparatus 5 is explained. FIG. 9 shows a block diagram of the data transfer apparatus 5 of the first embodiment, wherein an input/output port 17a is connected to a memory 4, while input/output ports 17b, 17c are connected to data relays 6 in the network 2. The data transfer apparatus 5 includes the buffers 7, 8 and 9, a memory address generator 12a, a tag generator 13, a counter 14, relay address generators 15a, 15b, controllers 16a, 16b, the input/output ports 17a, 17b and 17c, selectors 18a, 18b and 18c and a tag transformer 131. Reference characters 50, 50b and 50c designate addresses, reference characters 51, 51b and 51c designate data, and reference characters 52a and 52b designate buffer statuses.

Data flow from the input/output port 17a to the input/output port 17b is as follows: An address 50 generated by the memory address generator 12a is sent via the selector 18a to the memory 4. A data 51 is taken from the memory 4 via the input/output port 17a (memory read), and an output of the tag generator 13 is added as a tag to the data. Then, the data is stored in the buffer 7. Next, an address 50b generated by the relay address generator 15a is sent via the selector 18c, while a data 51b is sent from the buffer 7 via the selector 18b, both through the input/output port 17b to one of the data relays 6. The memory address generator 12a also counts the times of read. The tag will be explained later.

Data flow from the input/output port 17c to the input/output port 17a is as follows: An address 50c generated by the relay address generator 15b is sent to the other of the data relays 6, and a data 51c is taken via the input/output port 17c to be written in the buffer 9. Then, a part of an output of the buffer 9 is sent via a selector 18a to be added to the address 50 (memory write), while another part of the output of the buffer 9 is sent to be added to a data 51. The counter 14 counts the times of write.

Finally, data flow from the input/output port 17c to the input/output port 17b is as follows: An address 50c generated by the relay address generator 15b is sent to one of the data relays 6, and a data 51c is taken via the input/output port 17c from the one of the data relays 6. Then, a tag part of the data is transformed in the tag transformer 131 and the data is written in the buffer 8. Next, an address 50b which is a part of an output of the buffer 8 is sent via a selector 18c, while a data 51b which is the other part of the output of the buffer 8 is sent via a selector 18b, both through the input/output port 17b to the other of the data relays 6. That is, an output of the relay address generator 15a is used as a relay address when a data is transferred from the memory 4 to the network 2, while a part of a data is used as a relay address when a data is transferred from the network 2 to the network 2. An output of the memory address generator 12a is used as a memory address when a data is read, while a part of data is used as a memory address when the data is written.

Further, the controllers 16a, 16b monitor the buffer states 52a, 52b of the data relays 6.

Figure 10:
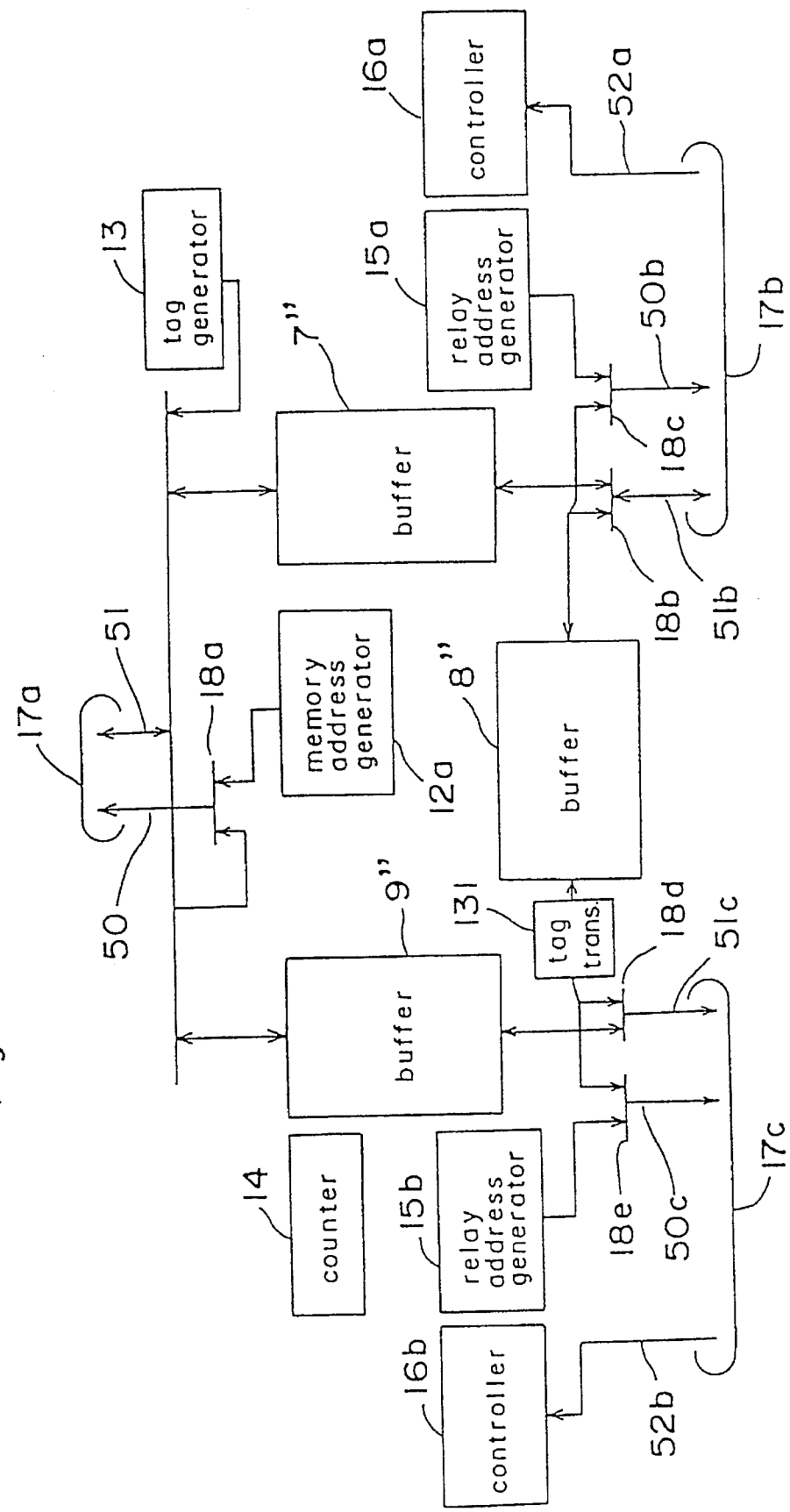
FIG. 10 is a block diagram of a bidirectional data transfer apparatus.

In the above-mentioned explanation, the communication in the input/output ports 17b, 17c is unidirectional. However, the communication in the input/output ports 17b, 17c may be bidirectional. FIG. 10 displays such a case, wherein buffers 7", 8", 9" and internal lines are bidirectional, and selectors 18e, 18d are provided in the input/output port 17c. Because only one tag transformer 131 is used, in the data flow from the input/output port 17c to the input/output port 17b, tag transformation is performed when a data is written in the buffer 8", while in the data flow from the input/output port 17b to the input/output port 17c, tag transformation is performed when an data is sent from the buffer 8".

Figure 11:
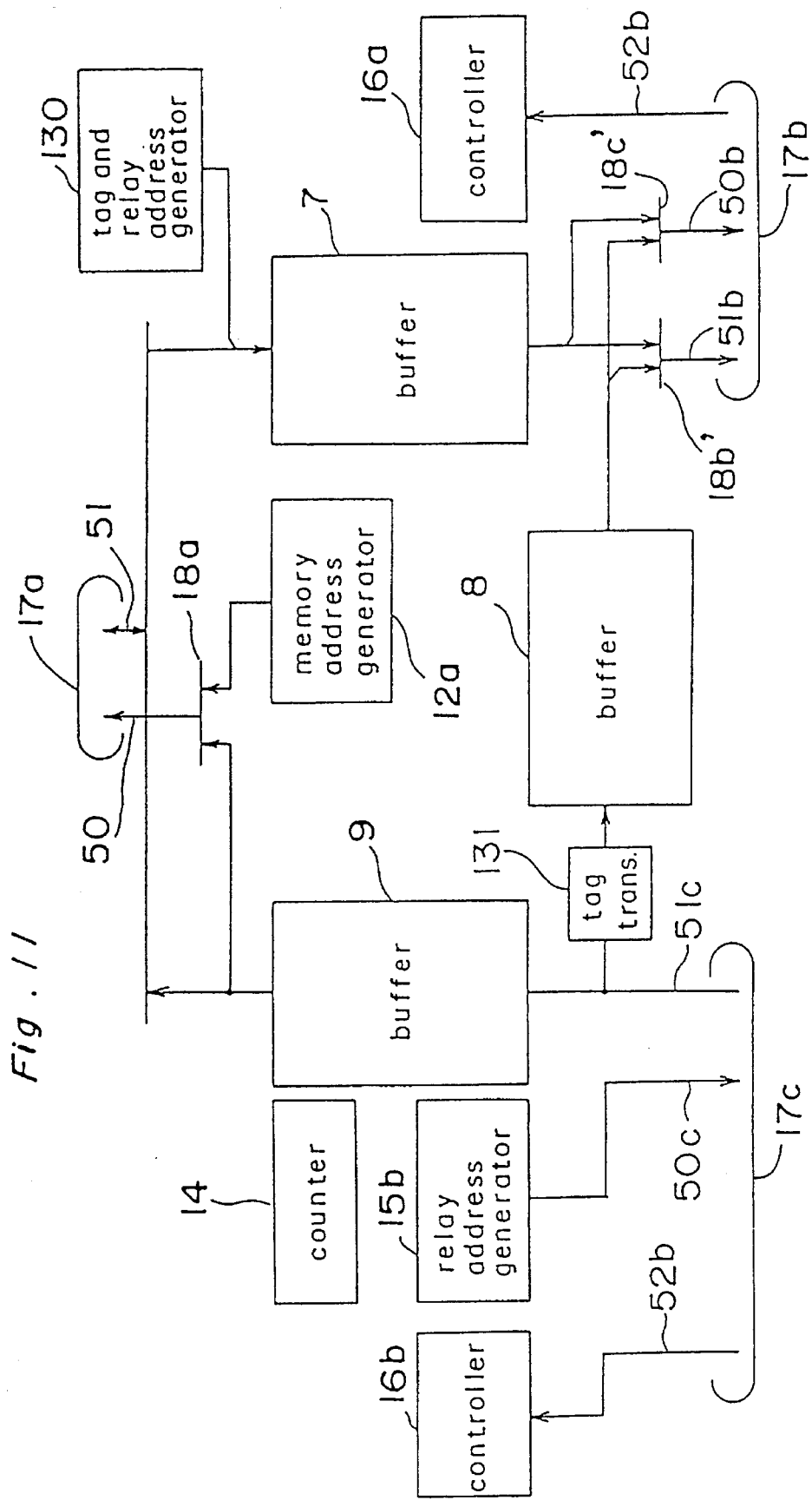
FIG. 11 is a block diagram of another data transfer apparatus.

Next, another data transfer apparatus displayed in FIG. 11 will be explained below. The data transfer apparatus is similar to that shown in FIG. 9 except several points as to the data flow from the input/output port 17a to the input/output port 17b. An address 50 generated by the memory address generator 12a is sent via a selector 18a. A data 51 is taken via the input/output port 17a from the memory 4 (memory read), and an output of a tag and relay address generator 130 is added as a tag to the data. The tag and relay address generator 130 is provided instead of the tag generator 13 and the relay address generator 15a used in FIG. 9. Then, the data is stored in a buffer 7. Next, a part of the output of the buffer 7 is sent as an address 50b via a selector 18c', while another part of the output of the buffer 7 is sent as a data 51b via a selector 18b', both via the input/output port 17b to one of the data relays 6. That is, a part of the data is used as a relay address when a data is transferred both from a memory 4 to the network 2 and from the network 2 to the network 2. An address is generated by the relay address generator 15a in FIG. 9, while it is generated by the tag and relay address generator 130 in FIG. 11.

Figure 12:
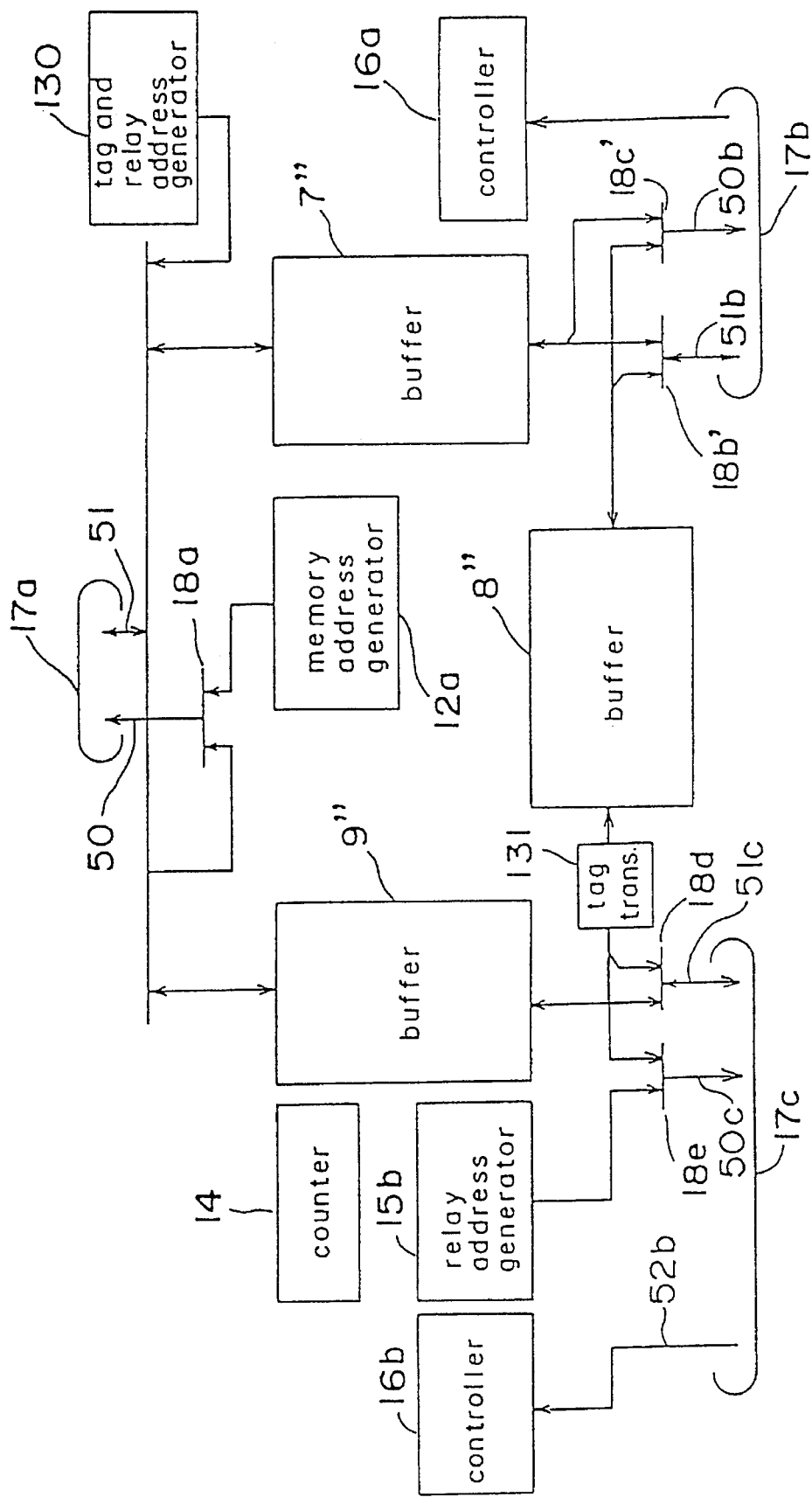
FIG. 12 is a block diagram of another bidirectional data transfer apparatus.

In the above-mentioned data transfer apparatus, the communication via the input/output ports 17b, 17c is unidirectional. However, the data transfer apparatus may be constructed for bidirectional communication, as shown in FIG. 12. In this case, buffers 7", 8", 9" and internal lines are bidirectional, and selectors 18e, 18d are provided in the input/output port 17c. Because only one tag transformer 131 is used, when a data flows from the input/output port 17c to the input/output port 17b, tag transformation is performed when a data is written in the buffer 8, while when a data flows from the input/output port 17b to 17c, tag transformation is performed when a data is read from the buffer 8.

Next, a tag generated in the generators 13, 130 will be explained with reference to FIG. 13, which displays the structure of data format. A data consists of a data part 24 and a tag part, and the tag part consists of a control information part 20 for attributes, format or the like of a data, a times part 21 for showing the times in a series of data transfer, relay address parts 22a, 22b and a memory address part 23. FIG. 13(a) displays a structure when a data is transferred between processor elements for sending and for relay (or between the processor elements 1a and 1c in FIG. 8), while FIG. 13(b) displays a structure when a data is transferred between processor elements for relay and for receiving (or between the processor elements 1c and 1d in FIG. 8). In the later case, a relay address part 22a is not used.

Next, the relation between a tag and the communication between processor elements will be explained with use of the data transfer apparatus displayed in FIG. 11 as an example.

Figures 13A, 13B:
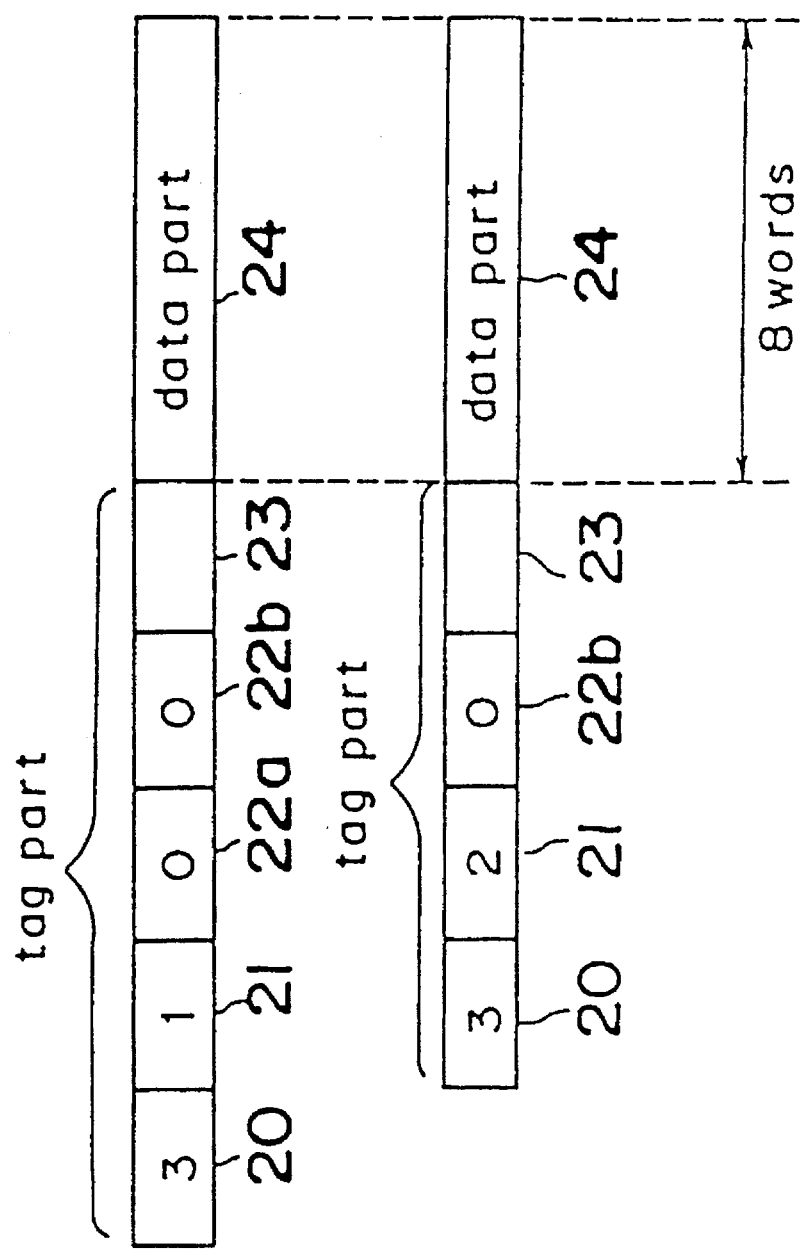
FIG. 13(a) is a diagram of data structure when data is transferred between processor elements for sending and for relay.
FIG. 13(b) is a diagram of data structure when data is transferred between processor elements for relay and for receiving.

In the tag and relay address generator 130, tags of control information data, of the times of data relay, of the address of the data relay 6e and of the address of the memory 4d are generated and added to the control information part 20, the times part 21, the relay address parts 22a, 22b and the memory address part 23, respectively, as shown in FIG. 13(a). For example, "3" which means a data length is added to the control information part 20, "1" which means the first time of relay is added to the times part 21. The data "3" means that the data length is $2^3$ or 8 words. Further, "0" is written to the relay address part 22a because the data relay 6a is located before, and "0" is also written in the relay address part 22b. The data relay 5a sends "0" to the relay address part 22a and sends a data to the data relay 6a.

Next, in the tag transformer 131 in the data transfer apparatus 5c, a data is taken from the data relay 6a, and "2" showing the second time of data relay is written in the times part 21 and the relay address part 22a is deleted so as to transform the format to that shown in FIG. 13(b). Then, the data transfer apparatus 5c sends "0" to the relay address part 22b and sends a data to the data relay 6e.

Finally, in the data transfer apparatus 5d, a data is taken from the data relay 6e and a tag of the memory address part 23 is sent, and a data is written in the memory 4d. Because the data part consists of eight words, eight words are written successively from an address shown in the memory address part 23.

If a plurality of data relays 6 is available as candidates for data communication, the data relays are scanned successively, and a data is taken from a data relay 6 which is ready for data transfer. In a series of operation, it is necessary for a data transfer apparatus 5 to determine either to send again a data received from the network 2 to the network 2 or to write it in a memory 4. This can be decided for example with reference to the times part 21. In a different example, a plurality of buffers in correspondence to the distance between processor elements are provided, and a data from a specified buffer is assigned to be sent to a memory while a data from another buffer is assigned to be sent to the network 2. Then, the times part 21 is not necessary. This method will be explained later with use of FIG. 14.

In the data transfer apparatus shown in FIG. 9, the relay address part 22a does not exist, and the relay address generator 15a generates a relay address at the first time of data relay.

As to the structure of tag, an end code may be added at the last of relay address parts instead of providing the times part 21.

In a different method, only the format shown in FIG. 13(a) is used and the relay address part 22a is sent at the first time while the relay address part 22b is sent at the second time without tag transformation. In this case, the tag transformer 131 is not needed for example in FIG. 9, while it is necessary to change the bit position selected at the second time from that at the first time. Further, the number of bits in a tag becomes larger, though a little bit.

By using the above-mentioned structure wherein an address information data is added to each data, data transfer can be conducted surely without a complex control in a system including a plurality of processor elements for sending and receiving data even if a plurality of data is sent and the order of data flow is random.

Next, a data relay 6 will be explained with reference to FIG. 14 displaying the structure of a data relay 6. The data relay has a first input/output port 36a, a second input/output port 36b, two buffers 10, 11 which receive a data from the first input/output port 36a and send a data to the second input/output port 36b. Further, an output selector 34 selects the inputs from the buffers 10, 11 and sent an output to the second input/output port 36b, while an input selector 35 selects the input from the first input/output port 36a and the output from the buffer 10.

The data relay 6 has two modes.

Figure 3:
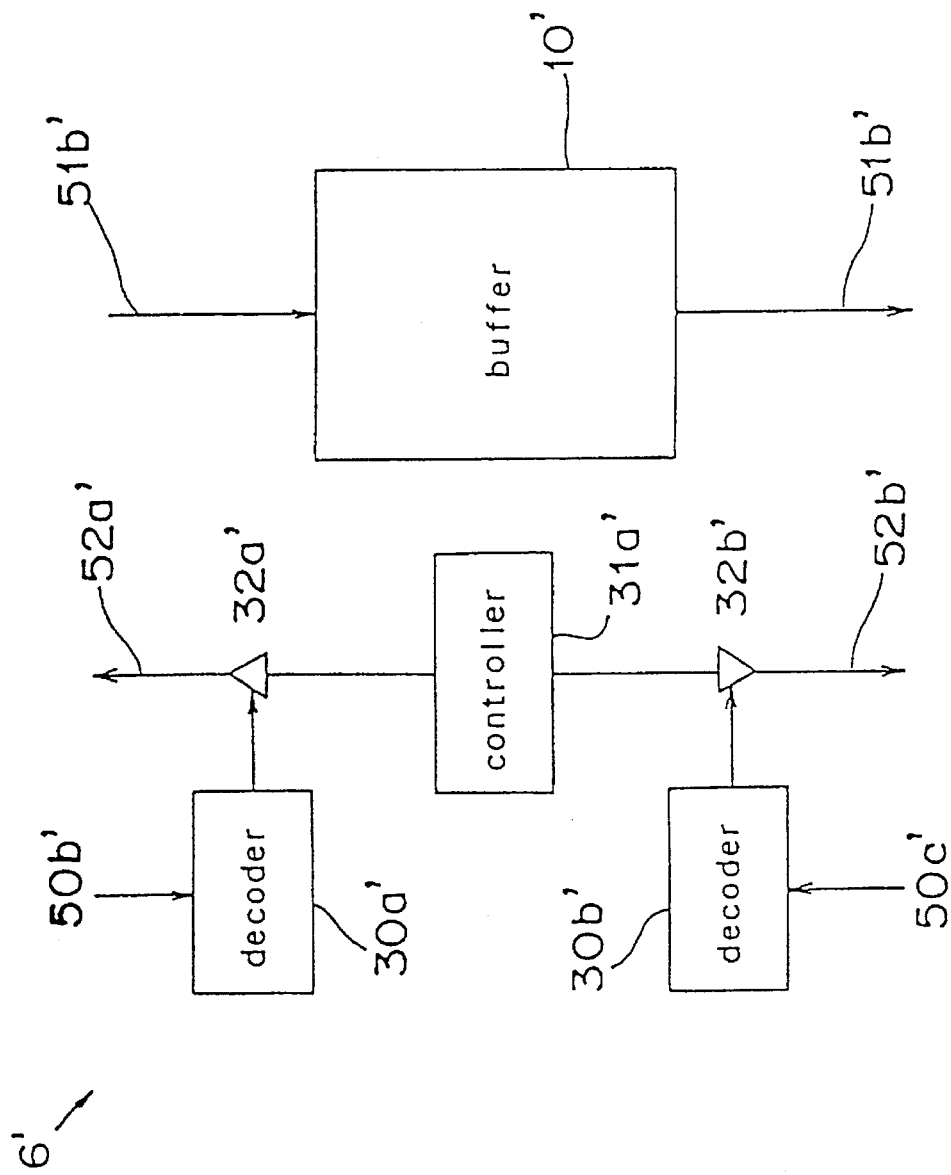
FIG. 3 is a block diagram of a prior art data relay.
Figure 4:
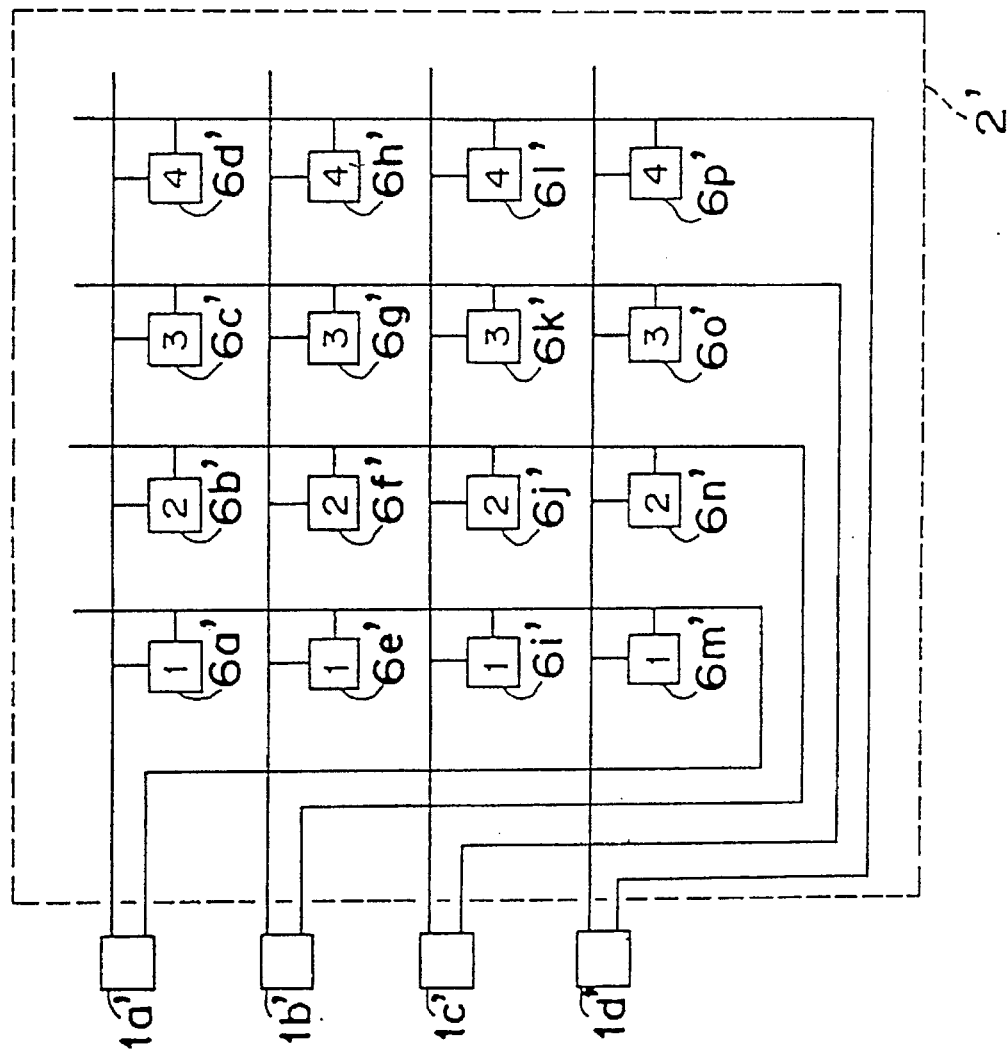
FIG. 4 is a block diagram of a prior art parallel processing system.

In the first mode, the data relay 6 is operated as a buffer. An input selector 35 selects the input of the buffer 10, while an output selector 34 selects the output of the buffer 11. Therefore, the buffers 10 and 11 are used as a single, continuous buffer. The action of the data relay 6 is similar to the prior art one 6' shown in FIG. 3. That is, the buffer controller 31a controls read/write of the buffers 10, 11. The decoders 30a, 30b monitor the addresses 50b, 50c and make tri-state buffers 32a, 32b enable when the decoders 30a, 30b are accessed, to pass the buffer statuses 52a, 52b to the external. At this time, a buffer controller 31b and tri-state buffers 32c, 32d are made disable.

In the second mode, the data relay 6 is operated as two parallel buffers. The input selector 35 selects the output of an input/output port 36a, while the output selector 34 selects the output of the buffer 10 or of the buffer 11 according to the demand. Therefore, the buffers 10 and 11 are used as two independent buffers. The controller 31a controls read/write of the buffer 10, while the controller 31b controls read/write of the buffer 11. The decoders 30a, 30b monitor the addresses 50a, 50c, and make the tri-state buffers 32a–32d enable when the decoders 30a, 30b are accessed, to pass the buffer statuses 52a–52d to the external. The buffer statuses relate to "buffer full" as to write and "buffer empty" as to read. The buffer statuses 52a, 52b relate to the buffer 10, while the buffer statuses 52c, 52d relate to the buffer 11.

In the second mode, it is to be noted that two buffers in correspondence to the distance "2" between processor elements exist in the data relay 6. In the data relays 6a, 6e shown in FIG. 8, the buffers 10a, 10e store data at the first time of relay, while the buffers 11a, 11e store data at the second time. Therefore, a data flows as shown with a dashed line in FIG. 8.

In FIG. 8, the data transfer apparatus 5c monitors the two buffer statuses of the data relay and communicates with a buffer with which a data can be communicated. The times part 21 of tag shown in FIG. 13 is not needed under the control to store a data in the buffer 8c when the data transfer apparatus 5c takes a data from the buffer 10a and to write a data in the buffer 9c when the data transfer apparatus 5c takes a data from the buffer 11a.

In the first mode of the data relay, deadlock may happen, while in the second mode, deadlock can be avoided when communication between processor elements is conducted via a third processor element because the data at the first time of relay can be processed independently of the data at the second time.

Figure 15:
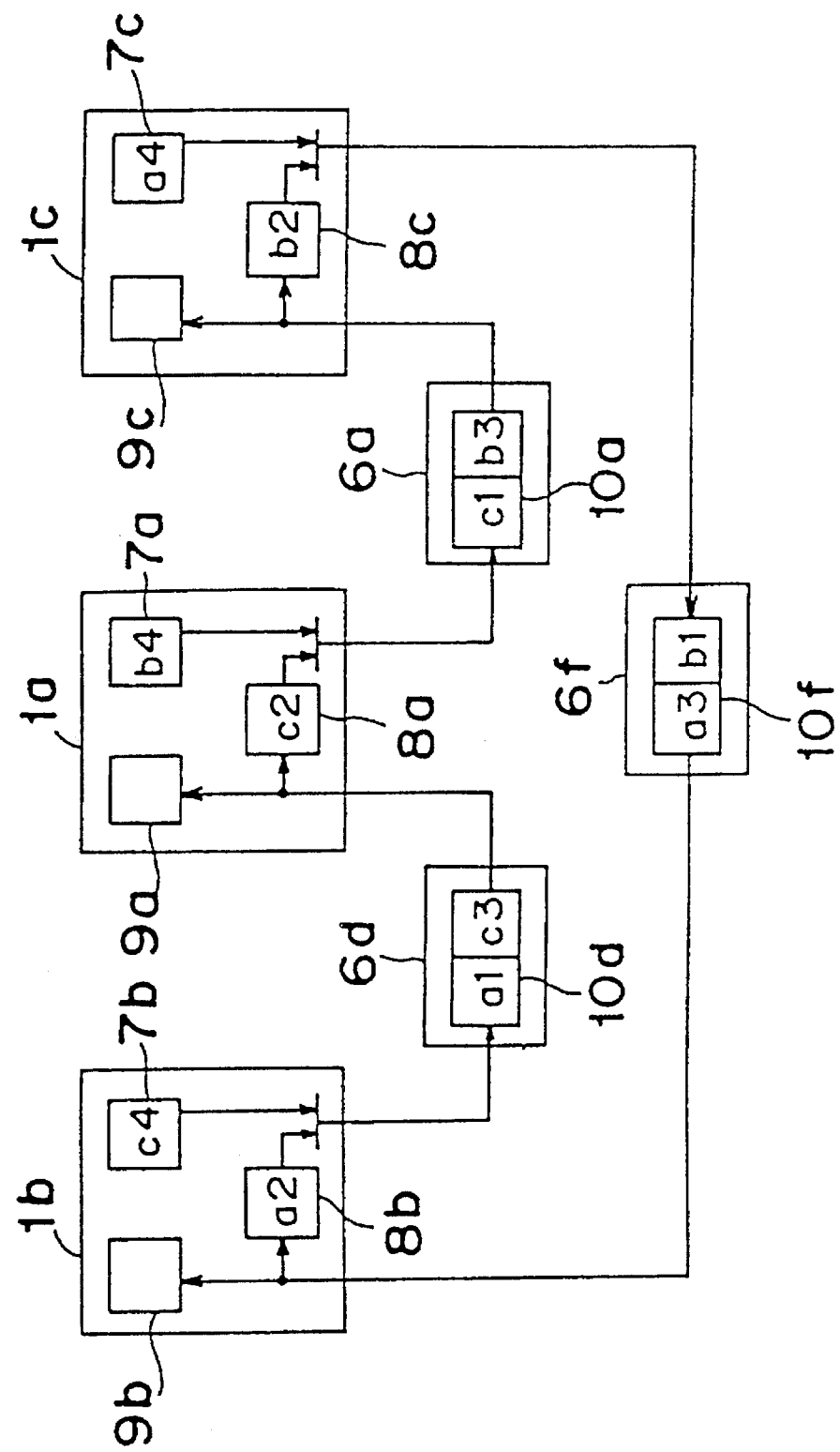
FIG. 15 is a diagram of data transfer in the first mode.

First, deadlock which is liable to happen in the first mode is explained. FIG. 15 shows the situation of deadlock in the first mode, wherein data flows between three processor elements 1a, 1b and 1c. Buffers 7, 8 and 9 are single-stage buffers consisting of two buffers connected in series, while buffers 10d, 10a and 10f are double-stage buffers consisting of two parallel buffers.

Data "c1", "c2", "c3" and "c4" are sent by the processor element 1b, relayed by the processor element 1a and received by the processor element 1c successively.

Data "b1", "b2", "b3" and "b4" are sent by the processor element 1a, relayed by the processor element 1c and received by the processor element 1b successively.

Data "a1", "a2", "a3" and "a4" are sent by the processor element 1c, relayed by the processor element 1b and received by the processor element 1a successively.

In the dead lock state shown in FIG. 15, if for example the processor element 1b wants to send a data "c4" or "a2", it cannot send the data because the buffer 10*d* in the data relay 6*d* is full. Though the data relay 6*d* wants to send the data, it cannot send the data because the buffer 8*a* in which the data is wanted to be written is full. In order to make a vacant site in the buffer 8*a*, it is necessary to make a vacant site in the buffer 10*a*. However, the buffer 10*a* cannot generate a vacant site because the buffer 8*c* in which the data "b3" is wanted to be written is full. In order to make a vacant site in the buffer 8*c*, it is necessary to make a vacant site in the buffer 10*f*. However, the buffer 10*f* cannot generate a vacant site because the buffer 8*b* is full. In order to make a vacant site in the buffer 8*b*, it is necessary to make a vacant site in the buffer 10*d*. Then, all the relevant buffers cannot generate a vacant site, or dead lock happens. As explained above, dead lock is liable to happen when a closed loop is constructed by processor elements.

Figure 16A:
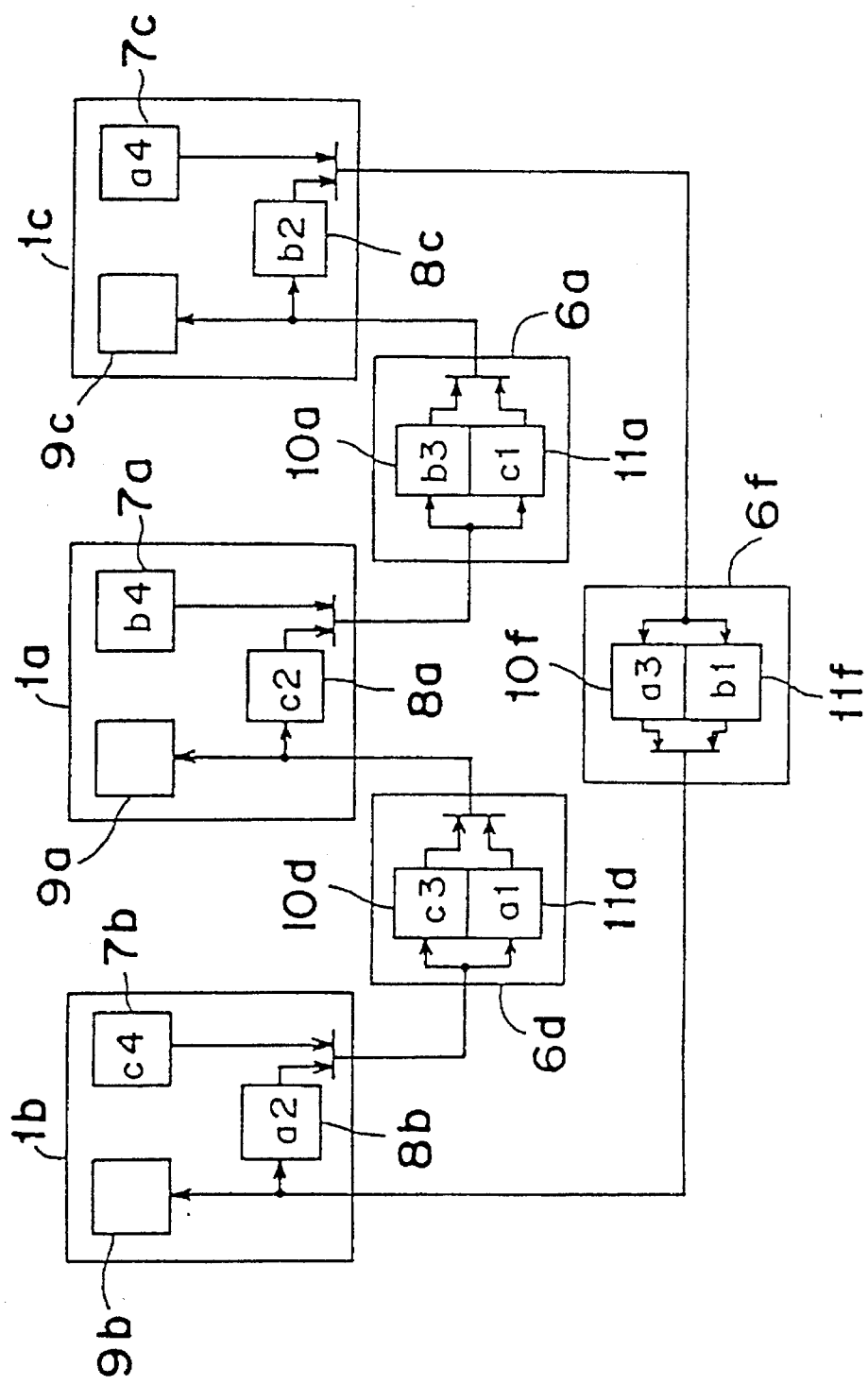
FIG. 16(a) is a diagram of data transfer in the second mode.
Figure 16:
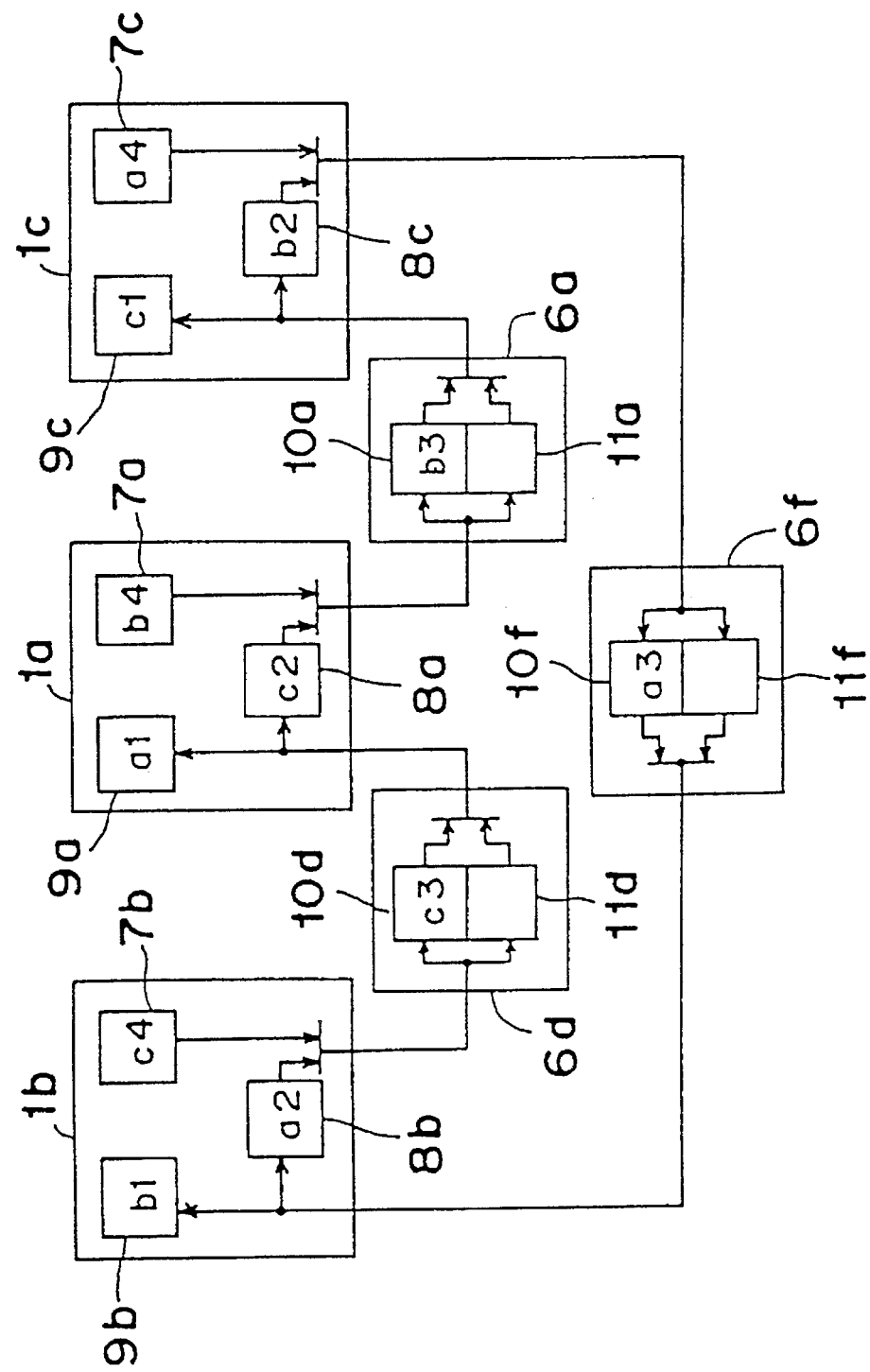
FIG. 16(b) is a diagram of data transfer in the second mode at the next step after the step shown in FIG. 16(a)

FIG. 16(*a*) displays a situation in the second mode in correspondence to FIG. 15 in the first mode. Buffers 7, 8 and 9 are single-stage buffers, while buffers 10*d*, 10*a*, 10*f*, 11*d*, 11*a*, 11*f* are double-stage buffers. For example in the data relay 6*d*, the data "c3" during the transfer at the first time is written in the buffer 10*d*, while the data "a1" during the transfer at the second time is stored in the buffer 11*d*.

FIG. 16(*b*) displays a situation at the next cycle, wherein the data "a1" is transferred to the buffer 9*a*, the data c1 is transferred to the buffer 9*c* and the data "b1" is sent to the buffer 9*b*. Because the data in the buffers 9*a*, 9*c* and 9*b* are written in the memories, the buffers will have vacant sites immediately. Then, for example, the processor element 1*b* can send the data "a2" via the buffer 11*d* to the buffer 9*a*. Because the buffer 8*b* will have a vacant site, the data "a3" in the buffer 10*f* can be transferred to the buffer 8*b*. Thus, data flow proceeds in secession similarly, and dead lock does not happen.

As explained above, the data transfer apparatus 5 operates surely when a random communication request is received. Further, transfer performance can be improved by assigning the priority between the data at the first time and at the second time. Further, when a data are transferred directly between the processor elements, large buffering becomes possible in the first mode.

Figure 14:
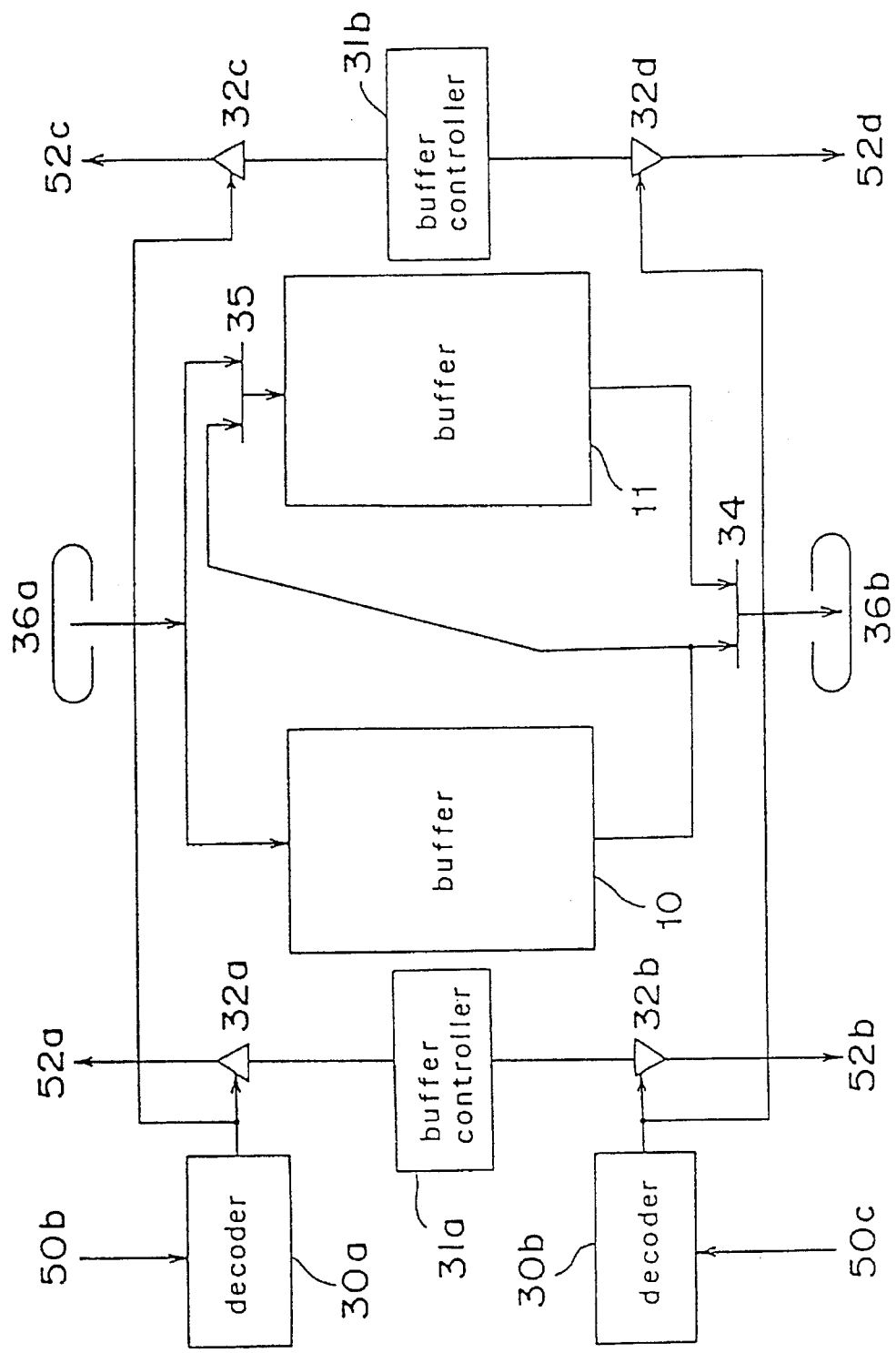
FIG. 14 is a block diagram of a data relay.

The data relay displayed in FIG. 14 has two buffers 10 and 11. However, a data relay may include a plurality of buffers. Such a data relay has a first input/output port, a second input/output port, N buffers wherein N is an integer of three or more, an output selector for receiving N inputs and for sending one output, and N−1 input selectors having two inputs and one output. The inputs of the output selector are connected to the outputs of the buffers, while the output of the output selector is connected to the first input/output port. The second input/output port is connected to the input of the first of the buffers and to each one of the two inputs of the N−1 input selectors. The inputs of the other buffers being connected to the output of the corresponding input selectors. The output of an L-th buffer (L is an integer between 1 and N−1) is connected to the other of the two inputs of the L-th input selector.

Next, the format of address data in the network 2 is explained with reference to FIGS. 17(*a*) and (*b*) displaying two examples of the structure of address data.

In general, in a parallel processing system, the bus width in the memories is larger than that in the network 2, and it is necessary to transform the data width at an interface with the network 2.

Figure 17A:
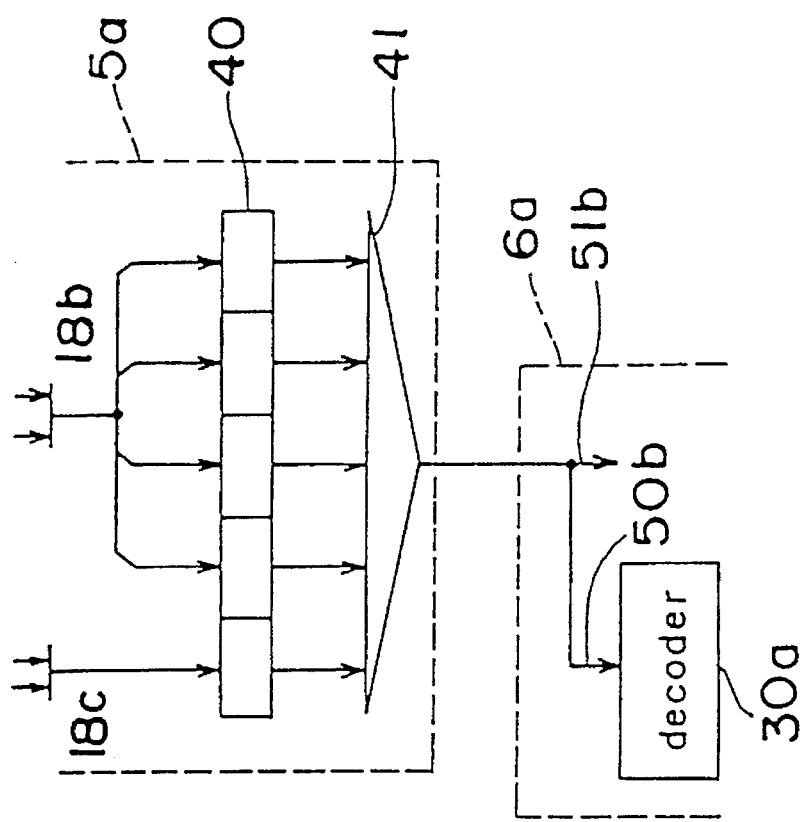
FIG. 17(a) and (b) are diagrams of data structures of address data.
Figure 17B:
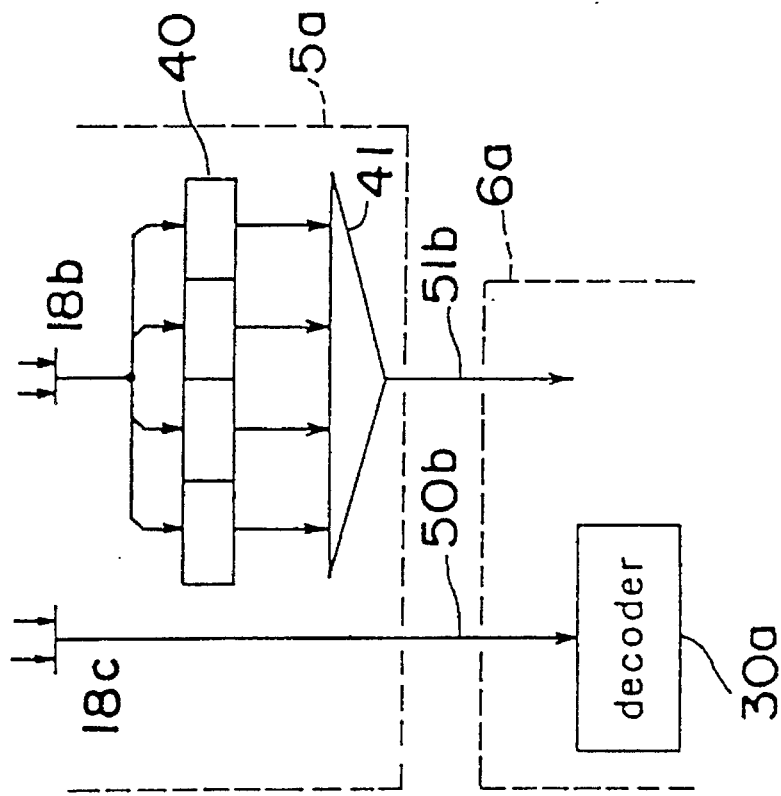

In FIG. 17(*a*), an address 50*b* is sent from a data transfer apparatus 5*a* to a decoder 30*a* in a data relay 6*a*. A data 51*b* (except address) is first stored in the output latch 40 in the data transfer apparatus 5*a*, and it is analyzed in the selector 41 to be inputted in the data relay 6*a*.

In FIG. 17(*b*), an address 50*b* and a data 51*b* are stored in the output latch 40 in the data transfer apparatus 5*a*, and it is analyzed by a selector 41 to be inputted in the data relay 6*a*, wherein the address 50*b* is stored in the decoder 30*a* and the data 51*b* is stored inside. In FIG. 17(*b*), address information is included in a data, and the data relay 6*a* always monitors an input data, and when an input data in correspondence to its own address appears, the data is taken. That is, this is data flow control. When compared with FIG. 17(*a*), the control logic becomes more complex, and the amount of transfer is larger. However, the number of connection lines between data transfer apparatuses 5 and data relays 6 becomes smaller.

Figure 18:
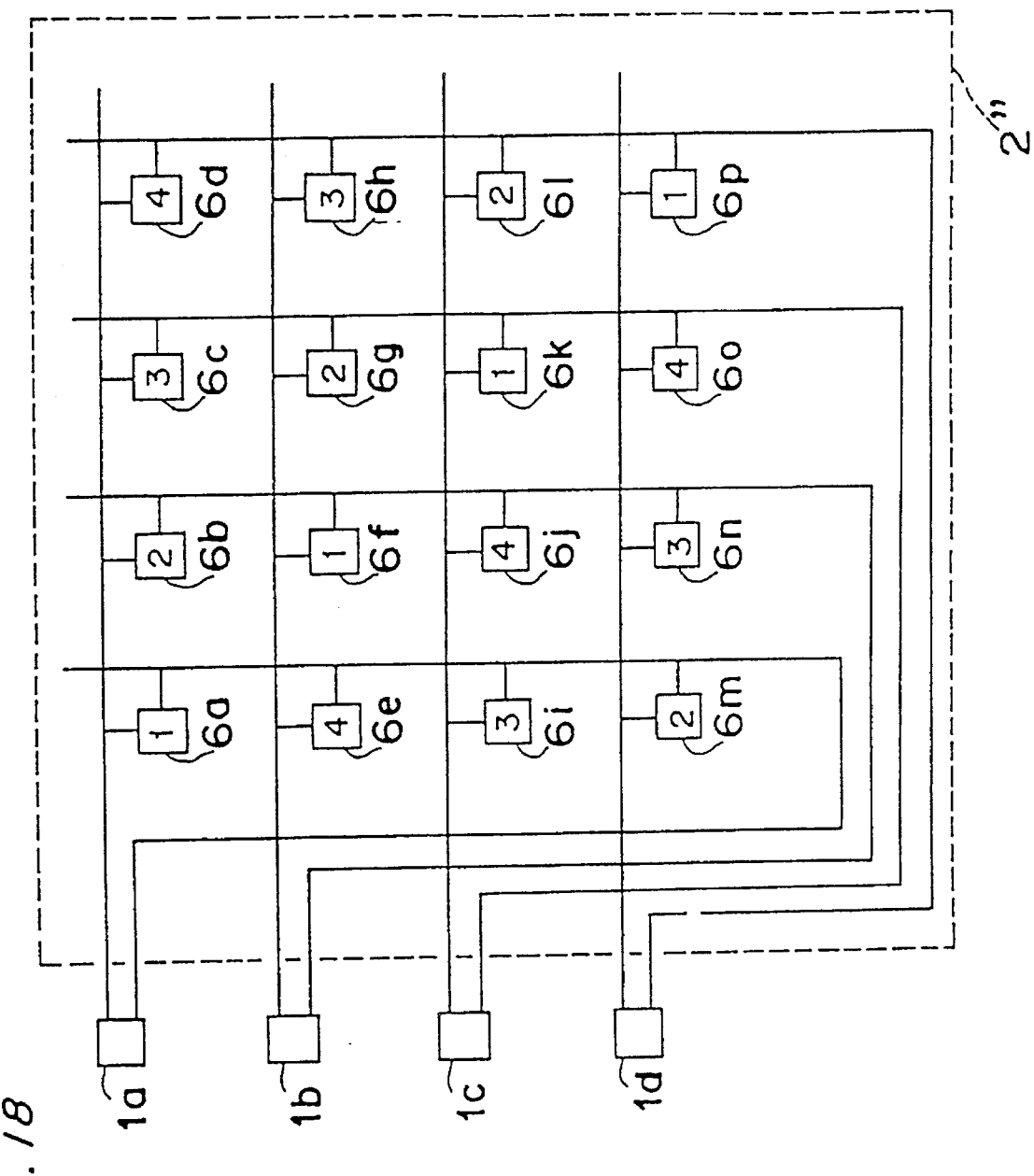
FIG. 18 is a diagram of a data transfer method.

Finally, FIG. 18 displays a data transfer method. This method is an example of a case wherein the network 2″ is a complete cross bar network. Processor elements 1*a*–1*d* has two terminals. The network 2″ has two-dimensional lattice points (K, L) wherein K, L are integers from one to four, and data relays 6*a* –6*p* are arranged at the lattice points. The data relays 6*a* –6*p* also have two terminals. One terminal of a data relay arranged at a lattice point (K, L) is connected to a K-th processor element, while the other terminal of the data relay is connected to an L-th processor element. In other words, one terminal of a K-th processor element is connected to data relays at lattice points (K, L) having L from one to four, while the other terminal is connected to data relays at lattice points (M, K) having M from one to four.

The order of sending data from a processor element 1*a*–1*d* in this Example is shown as numbers "1" to "4" displayed in the blocks of the data relays 6*a*–6*p*. That is, in the first step, processor elements 1*a*, 1*b*, 1*c* and 1*d* send data simultaneously to data relays 6*a*, 6*f*, 6*k* and 6*p*, respectively. In the next step, the processor elements 1*a*, 1*b*, 1*c* and 1*d* send data simultaneously to the data relays 6*b*, 6*g*, 6*l* and 6*m*, respectively. In the following steps, data are transferred similarly. When data are transferred to the final data relays 6*d*, 6*e*, 6*j*, 6*o* at the fourth step, the processor elements 1*a*–1*d* send data again as in the first step.

Figure 19:
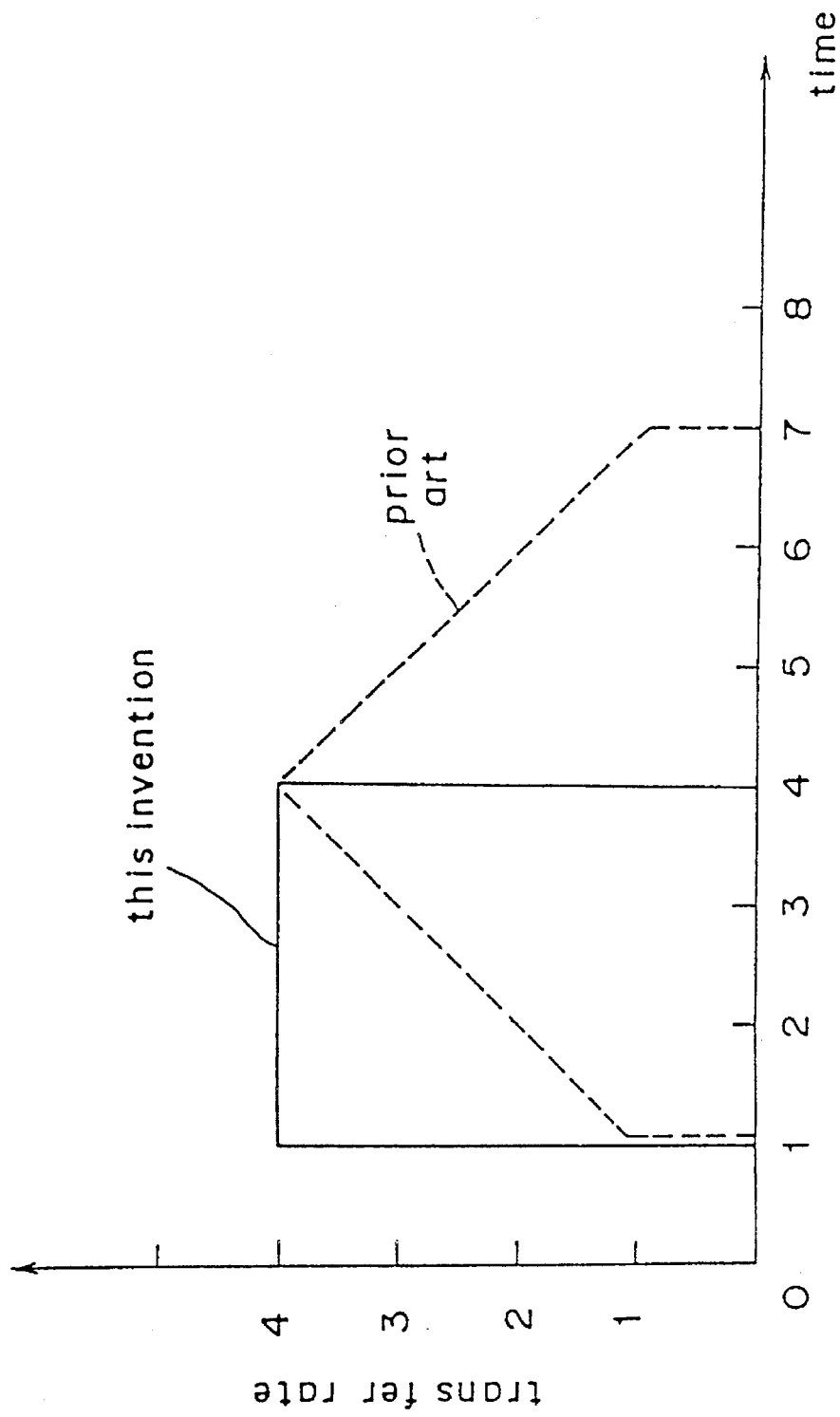
FIG. 19 is a graph of transfer rate plotted against time.

Then, after the completion of the first step, all processor elements 1*a*–1*d* can receive data. That is, the processor elements 1*a*, 1*b*, 1*c* and 1*d* can receive data via the data relays 6*a*, 6*f*, 6*k* and 6*p*, respectively. Therefore, the load does not concentrate in a special path in the network 2″, and the efficiency of data transfer is improved, as shown in FIG. 19. Priorly, the communication is conducted only through a channel at time "1". Therefore, the transfer rate is one. The transfer rate increases to two at time "2", to three at time "3" and to four at time "4". Then, the transfer rate decreases up to the final time "7", as shown as a dashed line. On the contrary, the transfer rate in this method is always four or all channels are active, and the transfer ends at time "4".

In general, in a system including a network having N×N of two-dimensional lattice points (K,L), wherein K, L are integers between one and N and buffers are arranged at lattice points(K, L), data transfer can be conducted as follows: In a first step, data are transferred via buffers at the lattice points (M, M) wherein M are integers from one to N. Next, data are transferred via buffers at the lattice points (M, M+1) or (M, M+1) if M+1 is larger than N. Data transfer is conducted in the following steps similarly. In a J-th step, data are transferred via buffers at the lattice points (M, M+J−1) or (M, M+J−1−N) if M+J−1 is larger than N.

It is to be noted that this example of FIG. 18 can also be applied to a system having a cross bar network partly, as shown in FIG. 6. In a first step, the processor elements 1*d*, 1*c*, 1*b* and 1*a* send data to the data relays 6*g*, 6*f*, 6*c* and 6*b*. In the next step, the processor elements 1*d*, 1*c*, 1*b* and 1*a* send data to the data relays 6*h*, 6*e*, 6*d* and 6*a*. As to the receive of data, the processor elements 1*d*, 1*c*, 1*b* and 1*a* can receive data from the data relays 6*g*, 6*c*, 6*f* and 6*b* at the first step. Therefore, every path in the network can be used effectively, similarly to the example shown in FIG. 18.

As mentioned above, the data flow is limited to a unidirectional one for simplicity. However, the embodiments explained above can be applied easily to bidirectional data flow by making the buffers bidirectional and by duplicating a part of components such as selectors.

The above-mentioned embodiments of the distance "2" between processor elements can be expanded easily to a parallel processing system of the distance "N" between processor elements. Further, it is also possible to realize a various kind of network by combining such systems.

At present, the limits of computation performance of a single processor and of semiconductor technology are understood, and a parallel processing system is expected highly. Therefore, this invention is very advantageous.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data relay, comprising:

a first input/output port;

a second input/output port;

N buffers wherein N is an integer of two or more, each of said N buffers having an input terminal, said N buffers having a first buffer, said first buffer being the leading buffer in a chain formed by said N buffers;

an output selector having N input terminals and one output terminal, said input terminals being connected to output terminals of the buffers, said output terminal of the output selector being connected to the second input/output port; and N−1 input selectors each of which is associated with a single buffer other than said first buffer, said N−1 input selectors each having two input terminals and one output terminal, the first input/output port being connected to the input terminal of said first buffer and to one of the two input terminals of each of the input selectors, the output terminal of the input selectors being connected to the input terminal of each of said N buffers except said first buffer, and the output of an L-th buffer, L being an integer sequentially increasing from 1 to N−1, being connected to the other of the two input terminals of an L-th input selector, said N−1 input selectors and said output selector controllable such that said data relay is operable in one of two modes, in said first mode said N buffers are coupled in a series configuration such that data input into said first input/output port is shifted through each of said N buffers prior to being output to said second input/output port; in said second mode said N buffers operate independently from one another such that data input into said first input/Output port can be shifted through only one of said N buffers prior to being output to said second input/output port.

2. A data relay according to claim 1, wherein in said first mode of operation, said output selector functions to couple the output of said N buffer to said second input/output port.

3. A data relay according to claim 2, wherein in said first mode of operation said input selectors function to couple the output terminal of said L-th buffer to the input terminal of the L-th+1 buffer.

4. A data relay according to claim 1, wherein said second mode of operation, said output selector functions to couple any of said output terminals of said N buffers to said second input/output port.

5. A data relay according to claim 4, wherein in said second mode of operation said input selectors function to couple the input terminals of said N buffers to said first input/output port.

* * * * *